United States Patent
Kurlagunda et al.

(10) Patent No.: US 8,305,124 B2
(45) Date of Patent: *Nov. 6, 2012

(54) RESET SIGNAL DISTRIBUTION

(75) Inventors: Ravi Kurlagunda, Fremont, CA (US);
Ravi Sunkavalli, Milpitas, CA (US);
Vijay Bantval, Cherry Hill, NJ (US);
Rahul Nimaiyar, Sunnyvale, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,382

(22) Filed: Dec. 2, 2011

(65) Prior Publication Data

US 2012/0074991 A1 Mar. 29, 2012

Related U.S. Application Data

(63) Continuation of application No. 12/559,009, filed on Sep. 14, 2009, now Pat. No. 8,072,250.

(51) Int. Cl.
*H03K 3/02* (2006.01)

(52) U.S. Cl. ........ 327/198; 327/142; 327/291; 327/293; 326/93

(58) Field of Classification Search .......... 327/141–163, 327/198; 331/1/A, 15–17; 375/373–376
See application file for complete search history.

(56) References Cited

U.S. PATENT DOCUMENTS

| | | | |
|---|---|---|---|
| 6,856,171 B1 | 2/2005 | Zhang | |
| 6,891,409 B2* | 5/2005 | Furuya | 327/141 |
| 7,434,080 B1* | 10/2008 | Kuo et al. | 713/500 |
| 8,072,250 B2 | 12/2011 | Kurlagunda et al. | |
| 2002/0070776 A1* | 6/2002 | Ishiwaki | 327/142 |
| 2005/0253638 A1* | 11/2005 | Dietrich et al. | 327/198 |
| 2009/0027085 A1 | 1/2009 | Ishii et al. | |
| 2011/0062997 A1 | 3/2011 | Kurlagunda et al. | |
| 2011/0193599 A1* | 8/2011 | Marie | 327/142 |

OTHER PUBLICATIONS

"U.S. Appl. No. 12/559,009, Notice of Allowance mailed Aug. 3, 2011", 10 pgs.
"U.S. Appl. No. 12/559,009, Response filed May 6, 2011 to Restriction Requirement mailed Apr. 8, 2011", 9 pgs.
"U.S. Appl. No. 12/559,009, Restriction Requirement mailed Apr. 8, 2011", 5 pgs.

* cited by examiner

*Primary Examiner* — Lincoln Donovan
*Assistant Examiner* — Brandon S Cole
(74) *Attorney, Agent, or Firm* — Schwegman, Lundberg & Woessner. P.A.

(57) ABSTRACT

Methods, circuits and systems may operate to generate a reset signal at an input reset block and synchronously distribute the reset signal, via a number of pipelined reset blocks, to multiple ports of a core circuit. The reset signal may be transmitted successively to each of the pipelined reset blocks to provide delayed reset signals having delay times. The delay times may be based on locations of the pipelined reset blocks in the reset circuit. One or more of the delayed reset signals may be programmably coupled to one or more ports of the core circuit. Additional methods, circuits, and systems are disclosed.

20 Claims, 6 Drawing Sheets

RESET SIGNAL DISTRIBUTION

This application is a continuation of U.S. patent application Ser. No. 12/559,009, filed on Sep. 14, 2009, now issued as U.S. Pat. No. 8,072,250, which is incorporated herein by reference in its entirety.

BACKGROUND

Reset signals may be used to initialize electrical circuits as a part of various system operations. In some cases, reset signals may be used to force a circuit into a known state for simulation or a defined state desired by a designer or a user.

A synchronous reset signal is often used to affect or reset state of flip-flops on the active edge of an associated clock signal. Thus, the synchronous reset signal should have a duration that is sufficient to be captured at the active clock edge. While a synchronous reset signal provides some immunity to glitches, unless they occur right at the active edge of an associated clock signal, it may not be very useful in power saving schemes where the clock signal is gated.

An asynchronous reset signal may be used to affect the state of flip-flops and other circuitry asynchronously, without regard to the state of the clock signal. This may be useful in high speed circuits, as the data path becomes independent of reset signal. However, an asynchronous reset signal may not offer the same level of immunity to glitches that is provided by the synchronous reset signal, contributing to spurious circuit reset operations.

BRIEF DESCRIPTION OF THE DRAWINGS

Some embodiments disclosed herein are illustrated by way of example and not limitation in the figures of the accompanying drawings in which.

DETAILED DESCRIPTION

Example methods, circuits and systems for reset distribution within a synchronous circuit will now be described. In the following description, numerous examples having example-specific details are set forth to provide an understanding of example embodiments. However, after reading this disclosure, it will be evident to one of ordinary skill in the art that the present examples may be practiced without these example-specific details and/or with different combinations of the details than are given here. Thus, specific embodiments are given for the purpose of simplified explanation, and not limitation.

Some example embodiments described herein may comprise a method including generating a reset signal at an input reset block and synchronously distributing the reset signal, via a number of pipelined reset blocks, to multiple ports of a core circuit. The reset signal may be transmitted successively to each of the pipelined reset blocks to provide delayed reset signals having variable delay times. The delay times may be based on positions of the pipelined reset blocks in the reset circuit. One or more of the delayed reset signals may be programmably coupled to one or more ports of the core circuit.

Figure 1:
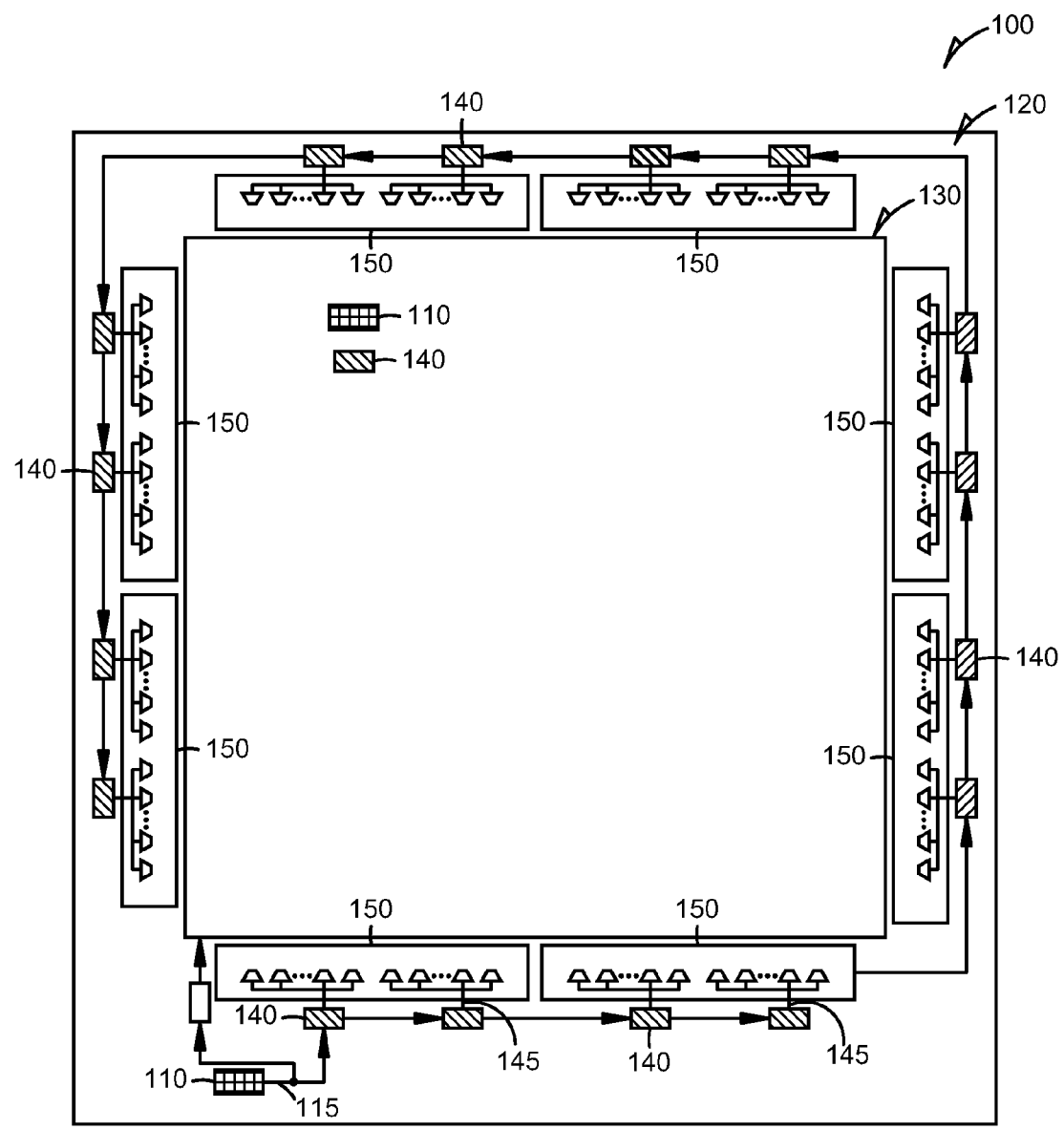
FIG. 1 is a block diagram illustrating an example reset distribution scheme implemented within an apparatus using a reset circuit to distribute a reset signal, according to various embodiments.

FIG. 1 is a block diagram illustrating an example reset distribution scheme implemented within an apparatus 100 (e.g., an integrated circuit, a processor, or a desktop computer, among others), using a reset circuit 120 to distribute a reset signal 115, according to various embodiments. The reset circuit 120 may comprise a synchronous reset circuit substantially surrounding a core circuit 130. In an embodiment, the core circuit 130 may comprise an asynchronous circuit including, for example, an asynchronous field programmable gate array (FPGA). In some embodiments, the core circuit 130 may be implemented using shapes other than a substantially square shape, such as a triangular or hexagonal shape. The core circuit 130 may be surrounded partially or fully by one or more reset circuits 120 that may extend to all sides of the core circuit 130 or may only cover (partially or fully) certain sides of the core circuit 130.

The reset signal 115 may be generated by an input reset block 110 and transmitted to a pipelined reset block 140. The reset circuit 120 may comprise multiple pipelined reset blocks 140 located at several positions around a periphery of the core circuit 130. The pipelined reset blocks 140 may be substantially uniformly distributed around the periphery of the core circuit 130. For example, one pipelined reset block 140 may be positioned on each of the four sides of the core circuit 130. The pipelined reset blocks 140 may be used to programmably distribute the reset signal 115, in a balanced manner, to input/output (I/O) ports of I/O banks 150 coupled to the core circuit 130.

Each pipelined reset block 140 may operate to receive the reset signal 115 from the input reset block 110, or a preceding pipelined reset block 140, and to transmit the reset signal 115 to a following pipelined reset block 140. Further, at each pipelined reset block 140, a delayed reset signal 145 may be provided to an I/O bank 150. The delayed reset signal 145 may be generated by delaying the reset signal 115 using a delay time (e.g., a variable delay time). The delay time provided by each pipelined reset block 140 may be set based on the location of the pipelined reset blocks 140 in the reset circuit 120 with respect to the input reset block 110.

The delay times applied to the reset signal 115 may be provided by delay counters (e.g., the pipelined counter 440 shown in FIG. 4), and may be may be reduced as the reset signal 115 progresses through the reset circuit. For example, in a reset circuit 120 having N pipelined reset blocks 140 (corresponding to N I/O banks of the core circuit 130), the delay time for a first pipelined reset block 140 (first encountered by the reset signal 115) may be approximately N times larger than the delay time for the last pipelined reset block 140 (last encountered by the reset signal 115), where N represents the number of pipelined reset blocks 140.

The delay times may be used to compensate for latencies of the reset signal due to distances traveled by the reset signal 115 between pipelined reset blocks 140. In an embodiment, the delay time may be programmably adjusted to operate more effectively with different number of pipelined reset blocks 140 and/or different distances between the pipelined reset blocks 140, due to diverse shapes of the core circuit 130 or different number of I/O banks 150. The programmability of the pipelined reset block 140 may be supported by one or more processors (e.g., processor 660 shown in FIG. 6).

Figure 2:
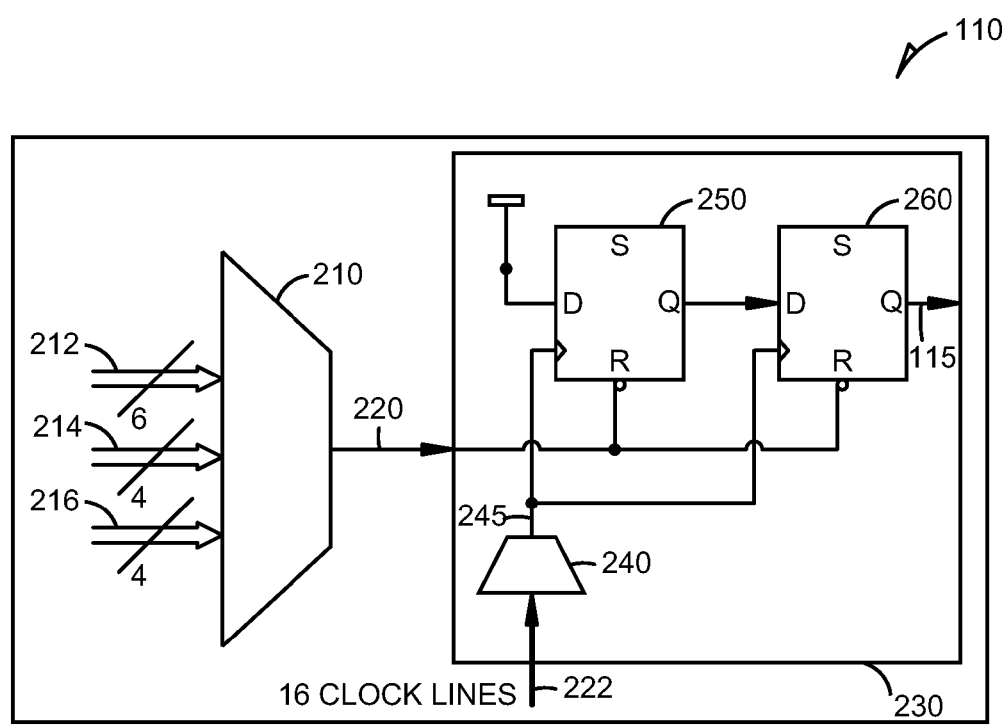
FIG. 2 is a diagram illustrating an example input reset block of the reset circuit of FIG. 1, according to various embodiments.

FIG. 2 is a diagram illustrating an example input reset block 110 of the reset circuit 120 of FIG. 1, according to various embodiments. Referring now to FIGS. 1 and 2, it can be seen that the input reset block 110 may provide a reset signal 115 to be distributed to various I/O banks 150 of the core circuit 130. The input reset block 110 may comprise an input multiplexer 210 and a synchronizer module 230. Input signals to the input reset block 210 may be programmably selected via the input multiplexer 210 from input signals coming from various sources. For example, input signals 212 (6 input signals) may be received from I/O pads of a clock bank located near the input reset block 210. Input signals 214 (4 input signals) may come from I/O pads of a general purpose bank located near the input reset block 210. Inputs 216 (4 inputs) may originate from asynchronous to synchronous converter elements of the core circuit 130. The programmability of the input multiplexer 210 may be supported by one or more processors (e.g., processor 660 shown in FIG. 6).

In some embodiments, the input signals 212, 214, and 216 to the input reset block 210 may be active low and substantially glitch-free signals. The input signals 212 and 214 can be optionally inverted before feeding to the input reset block 210. The input signals 212, 214, and 216 may be synchronous or asynchronous signals. When asynchronous, any of the input signals 212, 214, and 216 may be synchronized, for de-assertion (or assertion), with a local clock domain at a position in the reset circuit 120 where that reset signal (reset signal generated from the asynchronous input signals 212, 214, and 216) is consumed. When synchronous, any of the input signals 212, 214, and 216 may not be resynchronized, unless it is consumed in a position in the reset circuit 120 with a different clock domain than its own clock domain. The synchronizer module 230 may comprise a clock multiplexer 240 and flip-flops 250, 260.

The synchronizer module 230 may use the clock multiplexer 240 to programmably select a clock signal from multiple (e.g., 16) input global clock signals 222. The programmability of the clock multiplexer 240 may be supported by one or more processors (e.g., processor 660 shown in FIG. 6). The global clock signals 222 may be provided by, for example, a bank clock module. The selected clock signal 245 may be applied to clock inputs of the flip-flops 250 and 260. The flip-flops 250 and 260 may receive, at their reset inputs, an input reset signal 220 generated by the input multiplexer 210. The synchronizer module 230 may use the flip-flops 250 and 260 to synchronize the input reset signal 220 with the selected clock signal 245.

Figure 3:
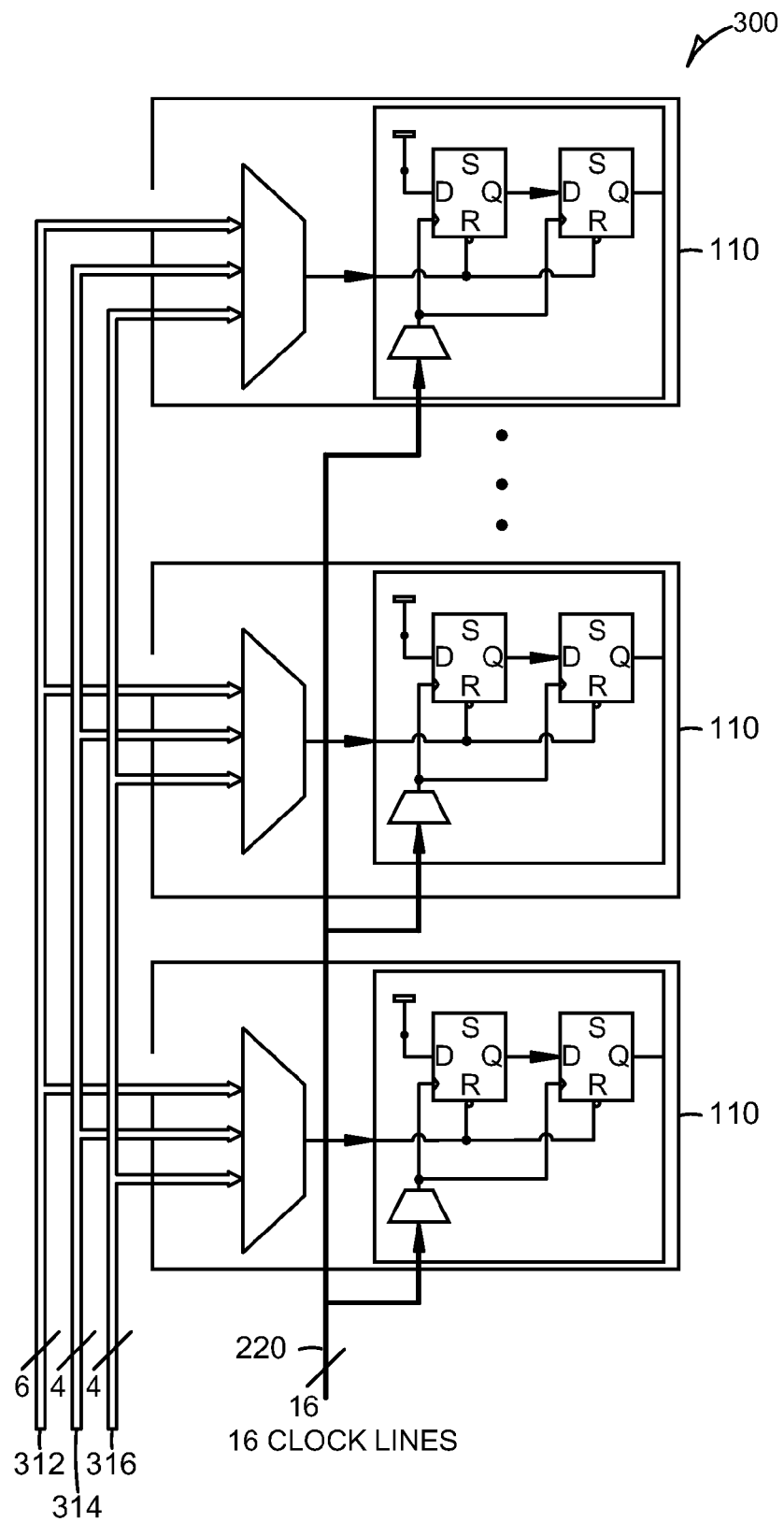
FIG. 3 is a diagram illustrating an example input reset module of the reset circuit of FIG. 1, according to various embodiments.

FIG. 3 is a diagram illustrating an example input reset module 300 of the reset circuit 120 of FIG. 1, according to various embodiments. The reset circuit 120 may comprise multiple (e.g., 16) input reset blocks 110 forming the reset module 300. The input reset module 300 may be located at the same corner of the reset circuit 120 of FIG. 1 as the input reset block 110 is located. The input signals 312, 314, and 316 to the reset module 300 may come from the same sources described above with respect to input signals 212, 214, and 216 of FIG. 2. For example, input signals 312 (6 input signals) may be received from I/O pads of the clock bank located near the input reset block 210 of FIG. 2. Input signals 314 (4 input signals) may come from I/O pads of a general purpose bank located near the input reset block 210 of FIG. 2. Inputs 316 (4 inputs) may originate from asynchronous to synchronous converter elements of the core circuit 130 of FIG. 1. The input signals 312-316 may be distributed to the multiple input reset blocks 110 and used as input signals to these reset blocks 110. The input reset blocks 110 may also share the same clock signal 220. In some embodiments, the reset circuit 120 may comprise more than one reset module 300. For example, other reset modules 300 may be positioned in other corners of the reset circuit 120 than the input reset block 110 of FIG. 1 is located.

Figure 4:
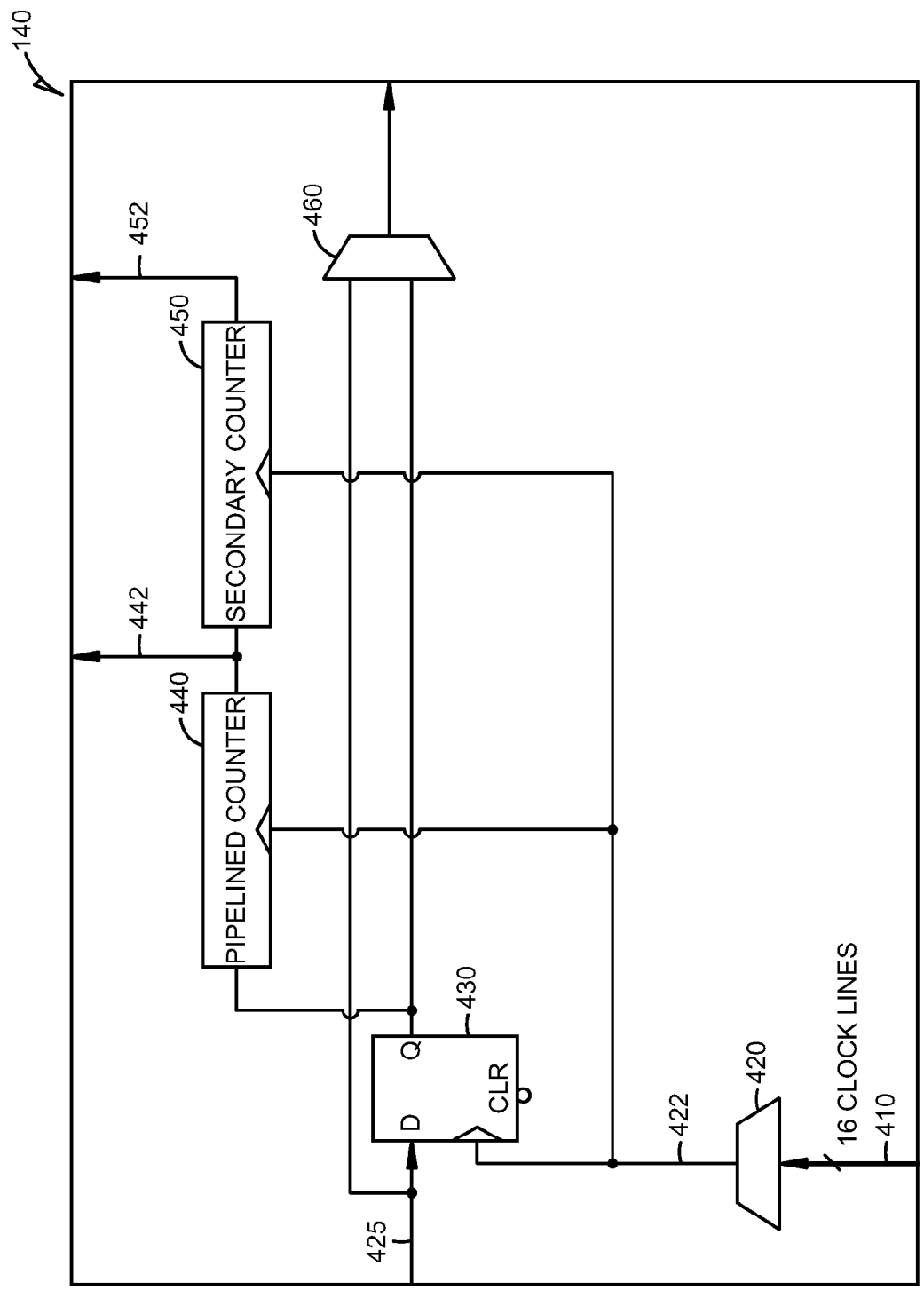
FIG. 4 is a diagram illustrating an example pipelined reset block used in the reset circuit of FIG. 1, according to various embodiments.

FIG. 4 is a diagram illustrating an example pipelined reset block 140 used in the reset circuit 120 of FIG. 1, according to various embodiments. The pipelined reset blocks 140 may be tasked to programmably distribute the reset signal 115 of FIG. 1, in a balanced manner, to the I/O ports of the I/O banks 150 of FIG. 1. The balanced reset signals provided to the I/O banks 150 may have substantially matched latencies (e.g., assertion or de-assertion latencies). The pipelined reset block 140 may operate to delay the reset signal 115 (shown here as input reset signal 425) by a delay time. The delay time provided by each pipelined reset block 140 may be set based on the location of the pipelined reset blocks 140 in the reset circuit 120. For example, the delay times applied to the reset signal 115 may be may be reduced as the reset signal 115 progresses through the reset circuit, perhaps to compensate for latencies of the reset signal 115 due to distances traveled by the reset signal 115 between the pipelined reset blocks 140.

The pipelined reset block 140 may comprise a clock multiplexer 420, a flip-flop 430, a pipelined counter 440, a secondary counter 452, and an output multiplexer 460. The clock multiplexer 420 may operate to programmably select the clock signal 422 from a group of clock signals 410 (e.g., 16 clock signals, for example, similar to what occurs with respect to clock signals 222 of FIG. 2). The programmability of the clock multiplexer 420 may be supported by one or more processors (e.g., processor 660 shown in FIG. 6). The clock signal 422 may be applied to clock inputs of the pipelined counter 440 and the secondary counter 450 to synchronize the delayed reset signals 442 and 452. The clock signal 422 may also be applied to a clock input of the flip-flop 430 to resynchronize the input reset signal 425 with the clock signal 422. The output multiplexer 460 may operate to allow either the input reset signal 425 or a resynchronized version of the input reset signal 425 to pass to a following pipelined reset block 140.

The heart of the pipelined reset block 140 is the pipelined counter 440 that can operate to programmably provide the delay time. For example, at the Nth pipelined reset block 140 of the reset circuit 120, the pipelined counter 440 may generate a delay time which is approximately N times smaller than the first pipelined reset block 140 (assuming the pipelined reset blocks are positioned at equal distances from each other). In some embodiments, the pipelined reset blocks 140 may be positioned with unequal distances between them. The programmability of the pipelined counter 440 may allow the counter 440 to adjust the delay times according to the position of the pipelined reset block 140. The programmability of the pipelined counter 440 may be supported by one or more processors (e.g., processor 660 shown in FIG. 6). The delayed reset signal 442 provided by the pipelined counter 440 may have substantially matched de-assertion (or assertion) latencies.

Figure 5:
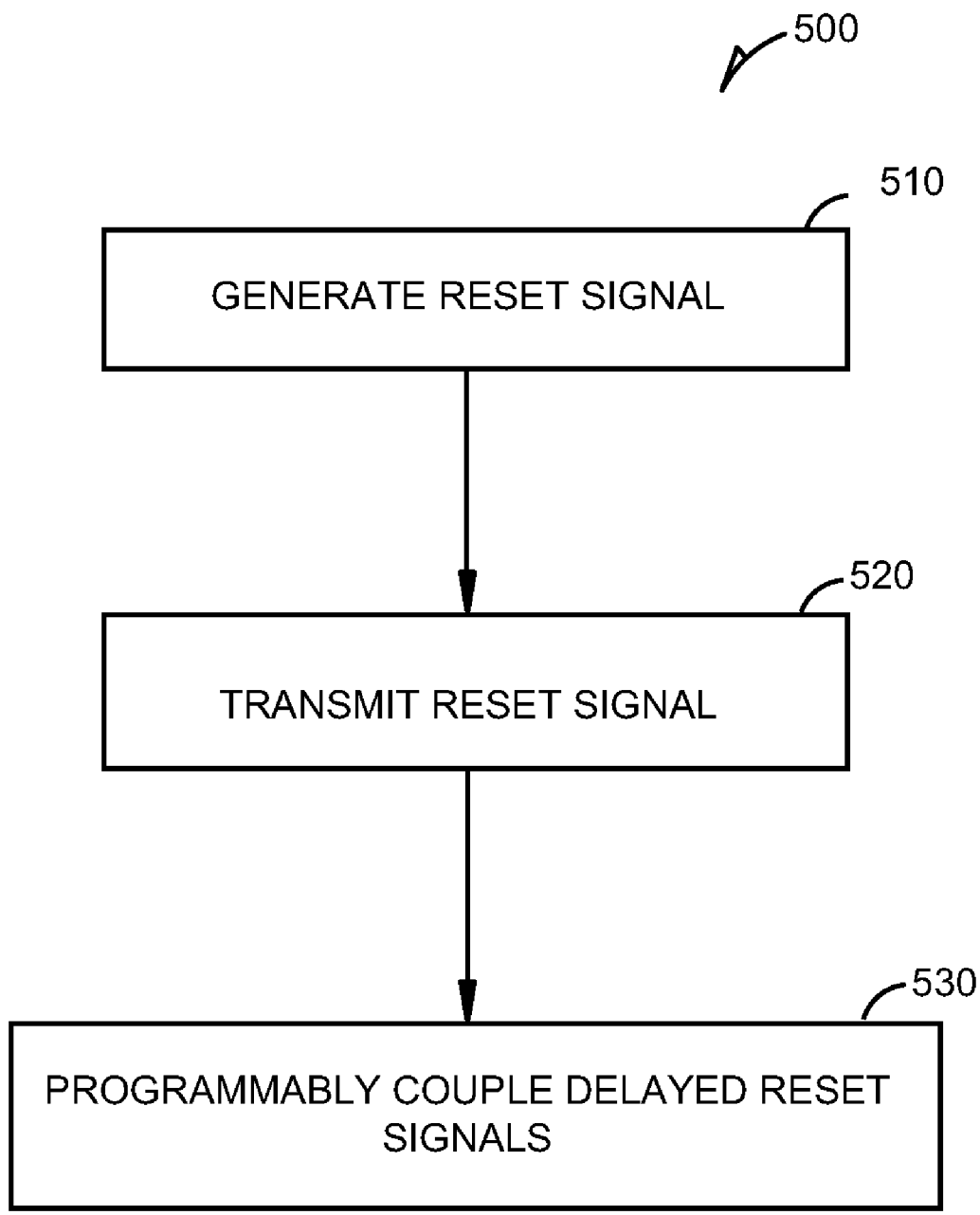
FIG. 5 is a flow diagram illustrating a method of distributing a reset signal, according to various embodiments.

FIG. 5 is a flow diagram illustrating a method 500 of distributing a reset signal 115, according to various embodiments. The method 500 may begin at operation 510, where the input reset block 110 of FIG. 1 may generate a reset signal.

The reset signal 115 may be distributed via pipelined reset block 140 of FIG. 1 to the I/O ports of the I/O banks 150 of FIG. 1.

At operation 520, the reset signal 115 may be successively transmitted to pipelined reset blocks 140 located at various positions of the reset circuit 120 of FIG. 1. At each pipelined reset block 140, the reset signal 115 may be delayed by a delay time. The delay time may be generated by the pipelined counter 440 of FIG. 4. The delay time generated at each pipelined reset block 140 may depend on the position of the pipelined reset block 140 in the reset circuit 120 and may be programmably adjusted as discussed with respect to FIG. 4.

At operation 530, the delayed reset signal 442 generated by the pipelined counters 440 of the pipelined reset blocks 140 may be coupled to the I/O ports of the I/O banks 150. The coupling of the delayed reset signal 442 to the I/O ports of the I/O banks 150 may be performed programmably. The programmability of the coupling may be supported by one or more processors (e.g., processor 660 shown in FIG. 6). For example, a program implemented by the processor 660 may operate to determine which of the pipelined reset blocks 140 are to be coupled to a certain I/O bank 150. Execution of the program may also operate to determine the delay time for the pipelined counter 440 of a particular pipelined reset block 140, based on the distance between the pipelined reset block 140 and other pipelined reset blocks 140.

Figure 6:
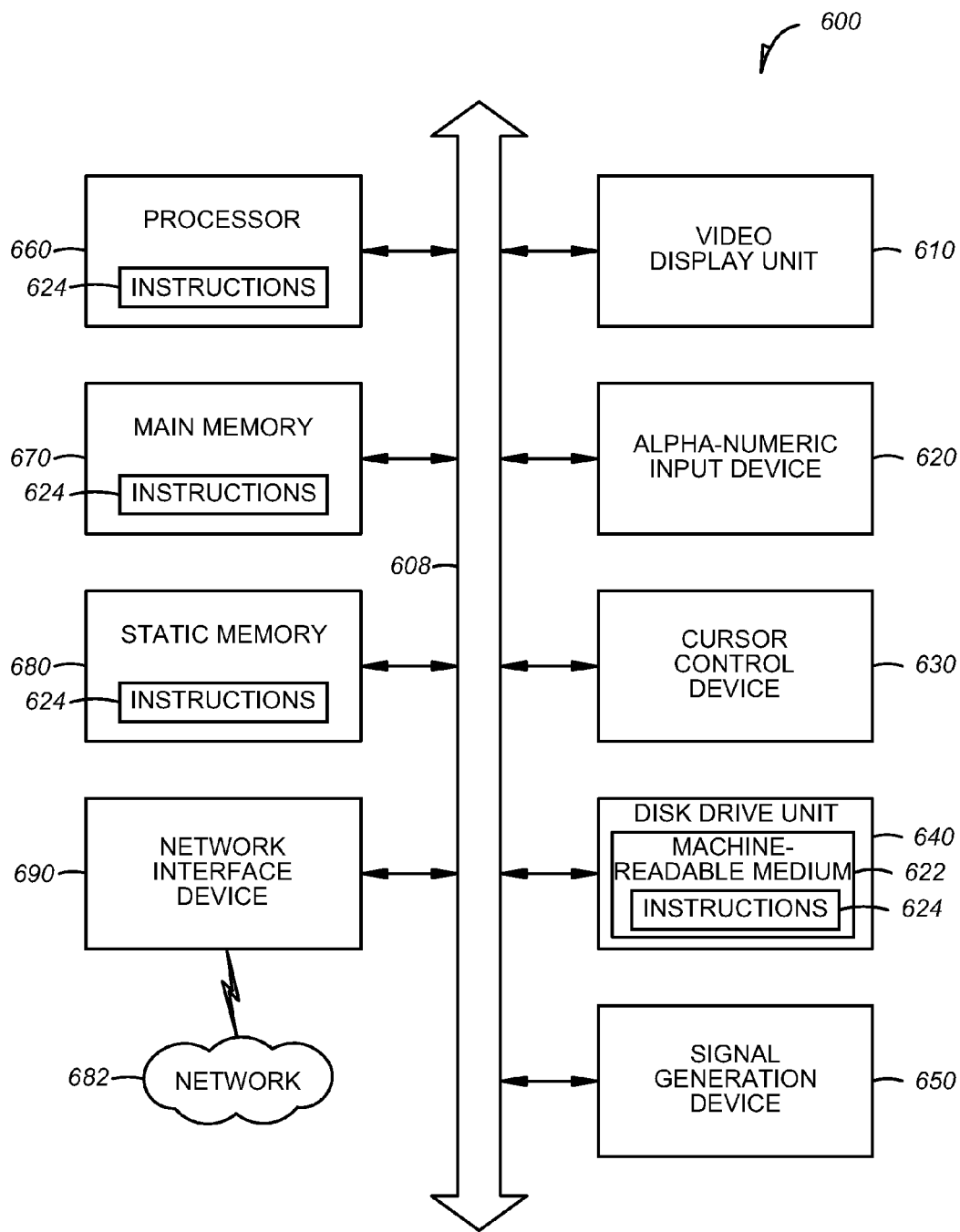
FIG. 6 is a block diagram illustrating a representation of a machine, according to various embodiments.

FIG. 6 is a block diagram illustrating a representation of a machine 600, according to various embodiments. The machine 600 comprises a set of instructions that can be executed to cause the machine 600 to perform any one or more of the methodologies discussed herein. In some embodiments, the machine 600 may operate as a standalone device or may be connected (e.g., networked) to other systems. In a networked deployment, the machine 600 may operate in the capacity of a server or a client system in a server-client network environment or as a peer system in a peer-to-peer (or distributed) network environment. Machine 600 may be realized as a specific machine in the form of a computer having a display and/or multiple processors, as well as a network interface. The machine 600 may operate to implement any one or more of the elements illustrated in FIG. 1. For example, the machine 600 may be similar to or identical to the apparatus 100 of FIG. 1, and the circuit 120 may form a part of any one or more elements of the machine 600, including the processor 660, memory 670, etc.

The machine 600 may comprise a server computer, a client computer, a personal computer (PC), a tablet PC, or any system capable of executing a set of instructions (sequential or otherwise) that specify actions to be taken by that system. Further, while only a single machine is illustrated, the term "machine" shall also be taken to include any collection of systems that individually or jointly execute a set (or multiple sets) of instructions to perform any one or more of the methodologies discussed herein.

The example machine 600 may include the processor 660 (e.g., a central processing unit (CPU), a graphics processing unit (GPU) or both), a main memory 670 and a static memory 680, all of which communicate with each other via a bus 608. The machine 600 may further include a video display unit 610 (e.g., a liquid crystal display (LCD) or cathode ray tube (CRT)). The machine 600 also may include an alphanumeric input device 620 (e.g., a keyboard), a cursor control device 630 (e.g., a mouse), a disk drive unit 640, a signal generation device 650 (e.g., a speaker), and a network interface device 690. The machine 600 may include one or more of any of these elements.

The disk drive unit 640 may include a machine-readable medium 622 on which is stored one or more sets of instructions (e.g., software) 624 embodying any one or more of the methodologies or functions described herein. The instructions 624 may also reside, completely or at least partially, within the main memory 670 and/or within the processor 660 during execution thereof by the machine 600, with the main memory 670 and the processor 660 also constituting machine-readable media. The instructions 624 may further be transmitted or received over a network 682 via the network interface device 690.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any one or more of the methodologies of the present technology. The term "machine-readable medium" shall accordingly be taken to include, but not be limited to tangible media, including solid-state memories and optical and magnetic media.

Various embodiments for reset distribution surrounding a synchronous circuit have been described. Implementing reset signals according to the various embodiments may result in improved performance, perhaps reducing power consumption and die area usage, while increasing processing speed. The described embodiments may also improve performance of synchronous circuits/systems by providing substantially balanced reset signal timing to I/O ports at different positions around a periphery of a circuit.

Although the present embodiments have been described, it will be evident after reading this disclosure, that various modifications and changes may be made to these embodiments. Accordingly, the specification and drawings are to be regarded in an illustrative rather than a restrictive sense.

The abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A method comprising:
   receiving a reset signal to be synchronously distributed via a plurality of pipelined reset blocks to a plurality of ports of a core circuit;
   transmitting the reset signal successively to at least some of the plurality of pipelined reset blocks to provide delayed reset signals having delay times based on locations of the at least some of the pipelined reset blocks; and
   programmably coupling at least one of the delayed reset signals to at least one of the plurality of ports of the core circuit.

2. The method of claim 1, further comprising synchronizing the reset signal, at an input reset block, with one of a plurality of clock signals.

3. The method of claim 1, further comprising distributing the reset signal to the core circuit, the core circuit comprising an asynchronous circuit surrounded by a reset circuit that includes at least some of the pipelined reset blocks.

4. The method of claim 1, further comprising programmably adjusting the delay times so that the delayed reset signals distributed to the plurality of ports of the core circuit have substantially balanced reset de-assertion latencies.

5. The method of claim 1, further comprising programmably adjusting the delay times by setting an Nth delay time at an Nth one of the pipelined reset blocks less than a first delay time at a first one of the pipelined reset blocks, where N is an integer greater than 1.

6. The method of claim 1, further comprising adjusting at least one of the delay times based on a distance between a first one of the pipelined reset blocks and a second one of the pipelined reset blocks.

7. The method of claim 1, further comprising synchronizing the received reset signal with a clock signal with which the reset signal was previously synchronized at an input reset block.

8. A machine-readable medium comprising instructions, which when executed by a machine, perform a method, the method comprising:
receiving a reset signal to be synchronously distributed via a plurality of pipelined reset blocks to a plurality of ports of a core circuit;
transmitting the reset signal successively to at least some of the plurality of pipelined reset blocks to provide delayed reset signals having delay times based on locations of the at least some of the pipelined reset blocks; and
programmably coupling at least one of the delayed reset signals to at least one of the plurality of ports of the core circuit.

9. The machine-readable medium of claim 8, wherein programmably coupling comprises:
programmably coupling the delayed reset signals to a plurality of input/output ports of a plurality of banks of the core circuit.

10. The machine-readable medium of claim 8, wherein the method further comprises:
resynchronizing the received reset signal in at least some of the plurality of pipelined reset blocks with one of a plurality of clock signals.

11. An integrated circuit comprising:
a plurality of pipelined reset blocks to distribute a reset signal to a plurality of ports of a core circuit, wherein at least some of the plurality of pipelined reset blocks are configured to receive and transmit the reset signal successively to a next one of the plurality of pipelined reset blocks and to provide delayed reset signals having delay times based on locations of the at least some of the pipelined reset blocks, at least one of the delayed reset signals to be programmably coupled to at least one of the plurality of ports of the core circuit.

12. The integrated circuit of claim 11, further comprising:
at least one reset input block to generate the reset signal, the at least one input block comprising a pair of multiplexers to receive input signals and to select a clock signal.

13. The integrated circuit of claim 11, wherein at least one of the plurality of pipelined reset blocks comprise a pipelined counter to adjust at least one of the delay times.

14. The integrated circuit of claim 13, wherein the pipelined counter is configured to programmably adjust the at least one of the delay times.

15. The integrated circuit of claim 14, wherein the programmably adjusting the at least one of the delay times comprises setting an Nth delay time at an Nth one of the pipelined reset blocks approximately N times smaller than a first delay time at a first one of the pipelined reset blocks.

16. The integrated circuit of claim 11, wherein the delay times are adjusted so that the delayed reset signals distributed to the plurality of ports of the core circuit have substantially balanced reset de-assertion latencies.

17. The integrated circuit of claim 11, wherein the pipelined reset blocks are located at approximately equal distances from each other.

18. The integrated circuit of claim 11, wherein at least one of the pipelined reset blocks further comprises:
a synchronizer to synchronize a received version of the reset signal with a clock signal selected by a multiplexer included in the at least one of the pipelined reset blocks.

19. The integrated circuit of claim 11, wherein at least one of the delay times is determined based on a distance between a first one of the pipelined reset blocks and a second one of the pipelined reset blocks.

20. The integrated circuit of claim 11, wherein the core circuit comprises:
an asynchronous circuit surrounded by a reset circuit that includes at least some of the plurality of pipelined reset blocks.

* * * * *